(12) United States Patent
Leung

(10) Patent No.: US 7,680,330 B2
(45) Date of Patent: Mar. 16, 2010

(54) METHODS AND APPARATUS FOR OBJECT RECOGNITION USING TEXTONS

(75) Inventor: Thomas King-Hong Leung, San Jose, CA (US)

(73) Assignee: FUJIFILM CORPORATION, Tokyo (JP)

( * ) Notice: Subject to any disclaimer, the term of this patent is extended or adjusted under 35 U.S.C. 154(b) by 1403 days.

(21) Appl. No.: 10/979,175

(22) Filed: Nov. 3, 2004

(65) Prior Publication Data

US 2005/0147302 A1 Jul. 7, 2005

Related U.S. Application Data

(60) Provisional application No. 60/519,639, filed on Nov. 14, 2003.

(51) Int. Cl.
| | |
|---|---|
| *G06K 9/00* | (2006.01) |
| *G06K 9/46* | (2006.01) |
| *G06K 9/66* | (2006.01) |
| *G06K 9/62* | (2006.01) |

(52) U.S. Cl. .................. 382/181; 382/118; 382/190; 382/225

(58) Field of Classification Search .............. 382/190, 382/118, 181, 225
See application file for complete search history.

(56) References Cited

U.S. PATENT DOCUMENTS

| | | | | |
|---|---|---|---|---|
| 6,028,960 | A * | 2/2000 | Graf et al. ................ | 382/203 |
| 2003/0210808 | A1 * | 11/2003 | Chen et al. ............... | 382/118 |
| 2004/0096120 | A1 * | 5/2004 | Tong et al. ............... | 382/285 |
| 2004/0190759 | A1 * | 9/2004 | Caldwell .................. | 382/117 |
| 2006/0233426 | A1 * | 10/2006 | Mariani ................... | 382/118 |

FOREIGN PATENT DOCUMENTS

JP 2003-317101 11/2003

OTHER PUBLICATIONS

Sergey Ioffe, "Red Eye Detection with Machine Learning," ICIP 2003.
Thomas Leung et al., "Representing and Recognizing the Visual Appearance of Materials using Three-dimensional Textons," Int'l Journal of Computer Vision 43(1), 29-44, 2001.
Richard Duda et al., "Pattern Classification," $2^{nd}$ edition, Wiley 2001; chapter relating to Fisher Linear Discriminant.

(Continued)

*Primary Examiner*—John B Strege
(74) *Attorney, Agent, or Firm*—Birch, Stewart, Kolasch & Birch, LLP

(57) ABSTRACT

Methods and an apparatuses for automatically recognizing and/or verifying objects in a digital image are presented. In one example, a method automatically recognizes objects in digital image data by detecting an object of interest in input digital image data, obtaining a normalized object of interest, assigning texton representations of the normalized object of interest to produce a first a texton array, and determining a similarity between the texton representations and previously determined texton representations of at least one other object. In another example, an apparatus for automatically recognizing objects in digital image data is presented, which includes an image processing control-operably coupled to memory and functional processing units for controlling recognition processing, where the functional processing units further include an object detection unit, a normalizing unit, a texton generation unit, and a similarity unit.

46 Claims, 10 Drawing Sheets

OTHER PUBLICATIONS

Richard Duda et al., "Pattern Classification," 2$^{nd}$ edition, Wiley 2001; chapter relating to k-Means.

Michael Collins et al., "Logistic Regression, AdaBoost and Bregman Distances," Proceedings of the Thirteenth Annual Conference on Computational Learning Theory, 2000.

T.F. Cootes et al., "Active Appearance Models," *Lecture Notes in Computer Science*, 1407;484, 1998.

Yoav Freund et al., "Experiments with a New Boosting Algorithm," Machine Learning: Proceedings of the Thirteenth International Conference, 1996.

Alex Pentland et al., "View-Based and Modular Eigenspaces for Face Recognition," M.I.T. Media Laboratory Perceptual Computing Section Technical Report No. 245; appeared in *IEEE Conference on Computer Vision & Pattern Recognition*, 1994.

P. Jonathon Phillips et al., "The FERET database and evaluation procedure for face-recognition algorithms," Image and Vision Computing, 16(5):295-306, 1998.

Henry Schneiderman et al., "A Statistical Method for 3D Object Detection Applied to Faces and Cars," in *IEEE Conf. On Computer Vision and Pattern Recognitions*, pp. 746-751, 2000.

Joshua B. Tenenbaum et al., "Separating Style and Content with Bilinear Models," *Neural Computation*, 12(6):1247-1283, 2000.

Thomas Vetter et al., "Linear Object Classes and Image Synthesis From a Single Example Image," IEEE Transactions on Pattern Analysis and Machine Intelligence, 19(7):733-742, 1997.

Laurenz Wiskott et al., "Face Recognition by Elastic Bunch Graph Matching," *PAMI*, 19(7):775-9, 1997.

Volker Blanz et al., "Face Recognition Based on Fitting a 3D Morphable Model," *IEEE Trans. Pattern Analysis and Machine Intelligence*, 25(9), 2003.

Hansen F. Chen et al., "In Search of Illumination Invariants," in *Proc. Conf.*, 2000.

T.F. Cootes et al., "View-Based Active Appearance Models," in *Proc. Intl. Conf. Automatic Face and Gesture Recognition*, 2000.

Oana G. Cula et al., "Compact Representation of Bidirectional Texture Functions," in *Proc. Computer Vision and Pattern Recognition*, pp. 1041-1047, 2001.

Athinodoros S. Georghiades et al., "From Few to Many: Illumination Cone Models for Face Recognition under Variable Lighting and Pose," *IEEE Trans. Pattern Analysis and Machine Intelligence*, 23(6), 2001.

Ralph Gross et al., "Eigen Light-Fields and Face Recognition Across Pose," in Proc. *Int'l Conf. Automatic Face and Gesture Recognition*, 2002.

Bela Julesz, "Textons, the elements of texture perception, and their interactions," *Nature*, 290(5802):91-7, Mar. 1981.

Hiroshi Murase et al., "Visual Learning and Recognition of 3-D Objects from Appearance," *International Journal on Computer Vision*, 14(1):5-24, 1995.

P. Jonathon Phillips et al., "Face Recognition Vendor Test 2002," Technical report, NIST, 2002.

Manik Varma et al., "Classifying Images of Materials: Achieving Viewpoint and Illumination Independence," in *Proc. European Conference Computer Vision*, pp. 255-271, 2002.

Sano, Masanori et al., "A Model of Preattentive Texture Boundary Detection," vol. 18, No. 24, ITEJ Technical Report, Japan, The Institute of Television Engineers of Japan, pp. 31-36.

Sano, Masanori et al., "Detection of Texture Borders Using Multiresolution Representation", vol. 91, No. 529, IEICE Technical Report, Japan, The Institute of Electronics, Information and Communication Engineers, pp. 89-96.

English Translation of Japanese Office Action issued on Jan. 4, 2010 for corresponding foreign case.

\* cited by examiner

METHODS AND APPARATUS FOR OBJECT RECOGNITION USING TEXTONS

CROSS-REFERENCE TO RELATED APPLICATION

This non-provisional application claims priority under 35 U.S.C. §119(e) of U.S. Provisional Application No. 60/519,639 filed Nov. 14, 2003. This application is also related to U.S. application Ser. No. 10/734,258, filed on Dec. 15, 2003, and Ser. No. 10/734,259, filed on Dec. 15, 2003. The entire contents of the above applications are relied upon and are expressly incorporated herein by reference.

BACKGROUND OF THE INVENTION

1. Field of the Invention

This invention relates to digital image processing and more particularly, to methods and apparatuses for recognizing and/or verifying objects in a digital image. Specifically, the invention relates to object recognition using operators which encode representative features of objects appearing in the digital image.

2. Description of the Related Art

Object recognition is an increasingly important area of computer vision which has a wide range of practical applications, such as, for example, image archiving, retrieval and organization, manufacturing, and security. In light of the need for improved industrial and national security, and also given the dramatically increasing popularity of digital photography, face recognition is becoming an important facet of object recognition. However, accurate face recognition is often difficult due to imaging conditions which can change due to external and internal factors. External factors include illumination conditions (e.g., back-lit versus front-lit, or overcast versus direct sunlight) and camera poses (e.g., frontal view versus side view). Internal factors include variations which may result directly from the passage of time (e.g., people aging) or changing object states (e.g., different facial expressions and accessories). In the field of pattern recognition, variations which imaged objects exhibit due to varying imaging conditions are typically referred to as intra-class variations.

The ability of an algorithm to recognize objects across intra-class variations determines its success in practical applications. Face recognition has traditionally been approached using 3-D model based techniques and feature-based methods. A feature common to face recognition systems is a similarity measure—where faces are considered similar if they belong to the same individual. The similarity measure can be used to verify that two face images belong to the same person, or to classify novel images by determining to which of the given faces the new example is most similar. However, designing a good similarity measure is difficult. Simple similarity measures such as those based on the Euclidean distance used directly in the image space do not typically work well because the image can be affected more by the intra-class variations than by inter-class variations. Therefore, a face recognition algorithm should be able to extract the image features that maximize the inter-class differences relative to the intra-class ones.

To make the best decision about the identity of a novel face example, an ideal system would have a representation of all the possible variations in appearance of each person's face—either as a model of the face and the environment, or as a large number of views of each face. If a large number of examples of each person are available in the gallery, then a model of each person can be computed and used to classify novel views of faces. However, in practice, the gallery may contain only a few examples of each person.

SUMMARY OF THE INVENTION

Embodiments consistent with the present invention are directed to methods and apparatuses for automatically recognizing and/or verifying objects in a digital image. One embodiment consistent with the present invention is directed to a method and an apparatus for automatically recognizing or verifying faces in digital images, such as digital photographs. In another embodiment consistent with the present invention, a method for automatically recognizing and/or verifying objects in a digital image comprises detecting an object of interest in input digital image data, obtaining a normalized object of interest, assigning texton representations of the normalized object of interest to produce a first a texton array, and determining a similarity between the texton representations and previously determined texton representations of at least one other object.

In another embodiment consistent with the invention, a method further comprises detecting and normalizing a plurality of reference objects from a plurality of images, obtaining a first plurality of filter responses based upon pixels forming the plurality of normalized reference objects, forming a first plurality of vectors based upon the first plurality of filter responses, and clustering the first plurality of vectors into a plurality of groups, wherein each group is assigned a texton label.

In another embodiment consistent with the invention, a method further comprises obtaining a second plurality of filter responses based upon pixels forming the normalized object of interest, forming a second plurality of vectors based upon the second plurality of filter responses, and creating a first texton label array by assigning the texton labels to each of the pixels forming the normalized object of interest.

In another embodiment consistent with the invention, a method further comprises forming a plurality texton arrays from images belonging to a training set taken from the plurality of normalized reference objects, selecting a pair of texton arrays from the plurality of texton arrays, determining, for each element in the pair of texton arrays, whether the texton label pair are in a same class, incrementing an element by one in a first conditional probability table based upon the determining finding the texton label pair are in the same class, incrementing an element by one in a second conditional probability table based upon the determining finding the texton label pair are in a different class, repeating the selecting, the determining, and each incrementing until all of the texton array pairs have been processed and normalizing the first and second conditional probability tables.

In another embodiment consistent with the invention, a method further comprises assigning texton labels to a probe image to produce a second texton array, determining first probabilities, for each location in the first and second texton arrays, that texton values of the normalized object of interest and the probe image are the same using the first conditional probability table, determining probability of total similarity by multiplying all of the first probabilities, determining second probabilities, for each location in the first and second texton array, that texton values of the normalized object of interest and the probe image are different using the second conditional probability table, determining probability of total dissimilarity by multiplying all of the second probabilities, computing a likelihood ratio using the probability of total similarity and probability of total dissimilarity, and determining a similarity between the normalized object of interest and the model image using the likelihood ratio.

In another embodiment consistent with the invention, a method further comprises assigning texton labels to the plurality of normalized reference objects to create a plurality of texton arrays, transforming the plurality of texton arrays into a vector, and computing a linear discriminant analysis using the vector to from basis vectors.

In another embodiment consistent with the invention, a method further comprises generating a first vector using the first texton array, determining first projections by projecting the first vector onto the Fisher Textons, assigning texton labels to a probe image to produce a second texton array, generating a second vector using the second texton array, determining second projections by projecting the second vector onto the Fisher Textons, and determining a similarity between the normalized object of interest and the probe image using the first and second projections.

In another embodiment consistent with the invention, an apparatus for automatically recognition objects in digital image data is presented, comprising an image processing control operably coupled to memory and functional processing units for controlling recognition processing, wherein the functional processing units further comprise an object detection unit for detecting an object of interest in input digital image data, a normalizing unit for obtaining a normalized object of interest, a texton generation unit for assigning texton representations of the normalized object of interest to produce a first a texton array, and a similarity unit for determining a similarity between the texton representations and previously determined texton representations of at least one other object.

BRIEF DESCRIPTION OF THE DRAWINGS

Further aspects and advantages of the present invention will become apparent upon reading the following detailed description taken in conjunction with the accompanying drawings, in which.

DETAILED DESCRIPTION

Embodiments consistent with the present invention are more specifically set forth in the following description with reference to the appended figures. Although the detailed embodiments described below relate to face recognition or verification, principles of the present invention described herein may also be applied to different object types appearing in digital images.

Figure 1:
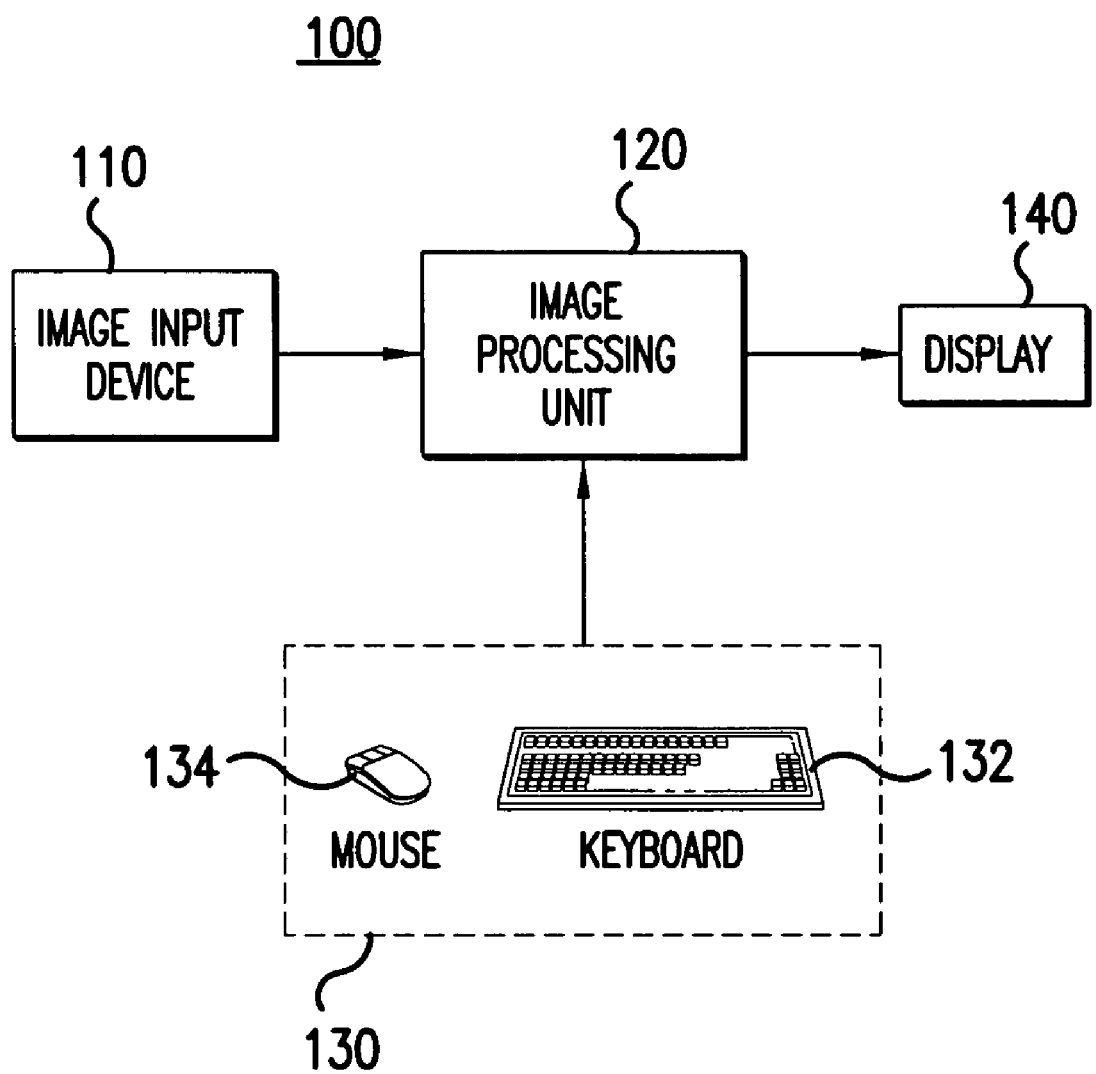
FIG. 1 is a block diagram of a system for performing object recognition and/or verification according to an embodiment consistent with the present invention.

FIG. 1 illustrates a block diagram of a system for recognizing and/or verifying objects in a digital image according to an embodiment of the present invention. The system 100 illustrated in FIG. 1 includes the following components: an image input device 110; an image processing unit 120; a user input unit 130; and a display 140. Operation of and functional interaction between the components illustrated in FIG. 1 will become apparent from the following discussion.

In one embodiment, the image input device 110 may provide digital image data, such as a digital photograph containing an object of interest (e.g., a face). The image input device 110 may be a scanner for scanning images recorded on paper or film, such as, for example, CCD sensors for photoelectronically reading R (red), G (green), and B (blue) image information from film or paper, and/or frame by frame acquisition. The image input device 110 may be one or more of any number of devices for providing digital image data, such as a recording medium (a CD-R, floppy disk, etc.), a network connection, and/or any digital image acquisition device, such as a digital camera, which may acquire directly an image in digital form. The image processing unit 120 may receive digital image data from the image input device 110 and perform object recognition and/or verification in a manner discussed in detail below. In the embodiment illustrated in FIG. 1, the user input unit 130 may include a keyboard 132 and a mouse 134. Various intermediate and final output products generated by the image processing unit 120 may be presented on display 140. In addition to performing object recognition and/or verification in accordance with embodiments of the present invention, the image processing unit 120 may perform additional functions such as color/density correction, compression, or other image processing functions known to one of ordinary skill in the art.

Figure 2:
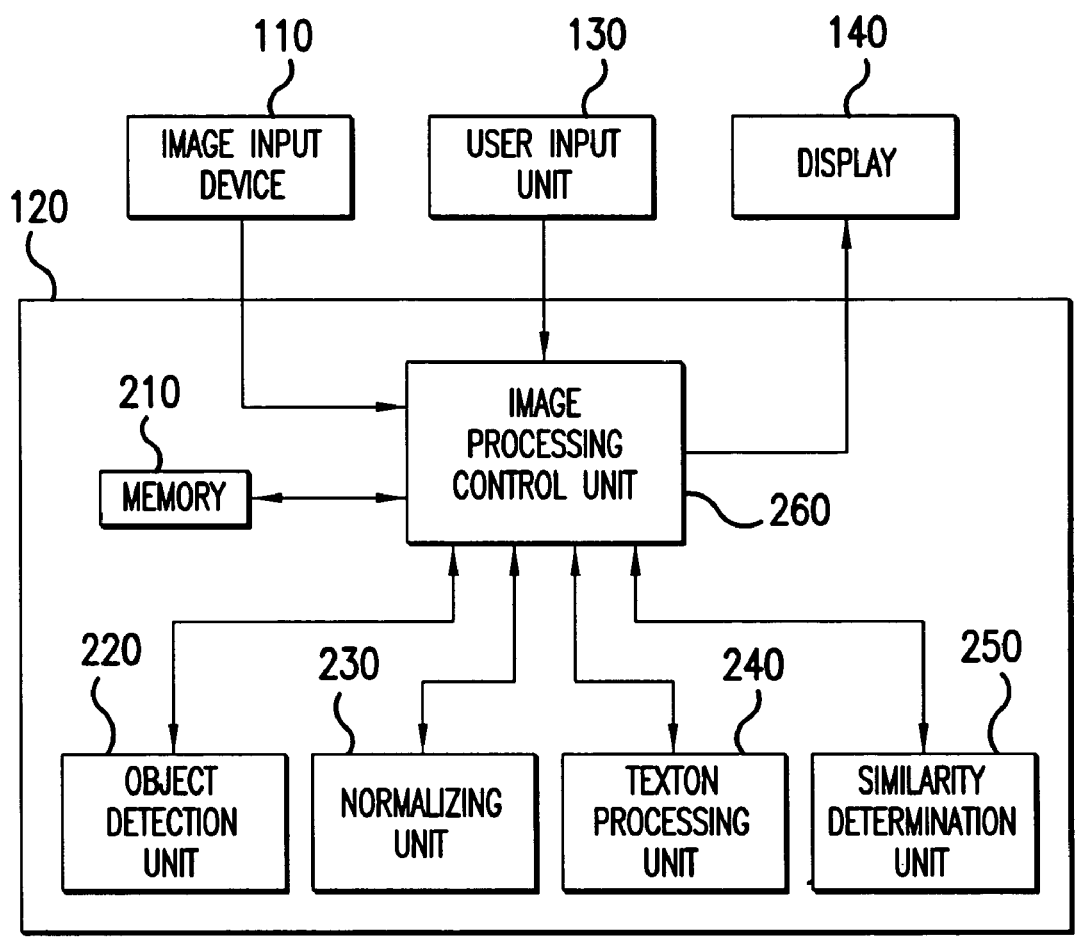
FIG. 2 is a block diagram illustrating details of an image processing unit consistent with an embodiment of the present invention.

FIG. 2 is a block diagram illustrating an example of the image processing unit 120 consistent with an embodiment of the present invention. As shown in FIG. 2, the image processing unit 120 of this embodiment includes: a memory 210; an object detection unit 220; a normalizing unit 230; a texton processing unit 240; a similarity detection unit 250; and an image processing control unit 260. Although the various components of FIG. 2 are illustrated as discrete elements, such an illustration is for ease of explanation and it should be recognized that certain operations of the various components may be performed by the same physical device, such as, for example, by a microprocessor of a personal computer, or may be distributed among a plurality of general and/or special purpose processors. One of ordinary skill in the art would also appreciate that each functional unit depicted may be performed partially or completely in software, hardware, and/or firmware, or in any combination thereof. Operation of the components of the image processing unit 120 will next be described with reference to the subsequent figures present below.

Operation of the image processing unit 120 may generally be divided into two stages: (1) training; and (2) automatic object recognition and/or verification. Training can be done in advance and offline, or it can be done during the recognition and verification process. Training may further involves two steps: (i) generating a universal texton vocabulary; and (ii) formulating the similarity measure. The universal texton vocabulary may be generated from a training database of reference objects of interest. This universal texton vocabulary may encode the variations of object appearances under varying imaging conditions and can be applied to all instances of the object of interest. The similarity measures may be learned during the training process. Using the database of objects with known identities, the features which can tell different objects apart may be learned. At the same time, the features which arise because of changing imaging conditions (intra-class variations) may be learned as well. Using these two sets of learned features, the similarity measure will be able to tell whether two images come from the same object or not in the automatic object recognition and/or verification stage. During this stage, (i) textons from the universal texton vocabulary are assigned to the object of interest, and (ii) it is determined whether two images belong to the same person.

Overview

After seeing many objects under a variety of different conditions, humans can build an implicit internal model of how objects change their appearance. Using this internal model, humans can imagine any object's appearance under novel conditions. For example, one can easily recognize a person from the side after only viewing a single frontal perspective. In another example, one can recognize a friend after not seeing them for a significant number of years. Several embodiments of the present invention feature the ability to recognize objects, in particular faces, under a variety of imaging conditions. These embodiments may utilize algorithmic models which loosely parallel human visual perception. That is, an algorithmic framework may be utilized to build a model to predict how the appearance of objects can change under different imaging conditions. One embodiment utilizes a Texton Correlation Model to accomplish this task. Textons may be a discrete set of representative local features for objects. The Texton Correlation Model efficiently encodes how textons transform when imaging conditions change. Once these transformations are taken into account, a similarity measure between images which is insensitive to imaging conditions may be performed. Using the Texton Correlation Model, faces can be recognized from a single image of a person under a wide range of illuminations and poses, and/or after many years of aging. Another embodiment utilizes the Fisher Texton model. The Fisher Texton model makes use of Linear Discriminant Analysis to compute a set of linear vectors that can best discriminate face images of different individuals from face images of the same individual. Similar to the Texton Correlation Model, the Fisher Texton model can be used to recognize faces across a wide variety of illumination, pose, and age changes.

Figure 3:
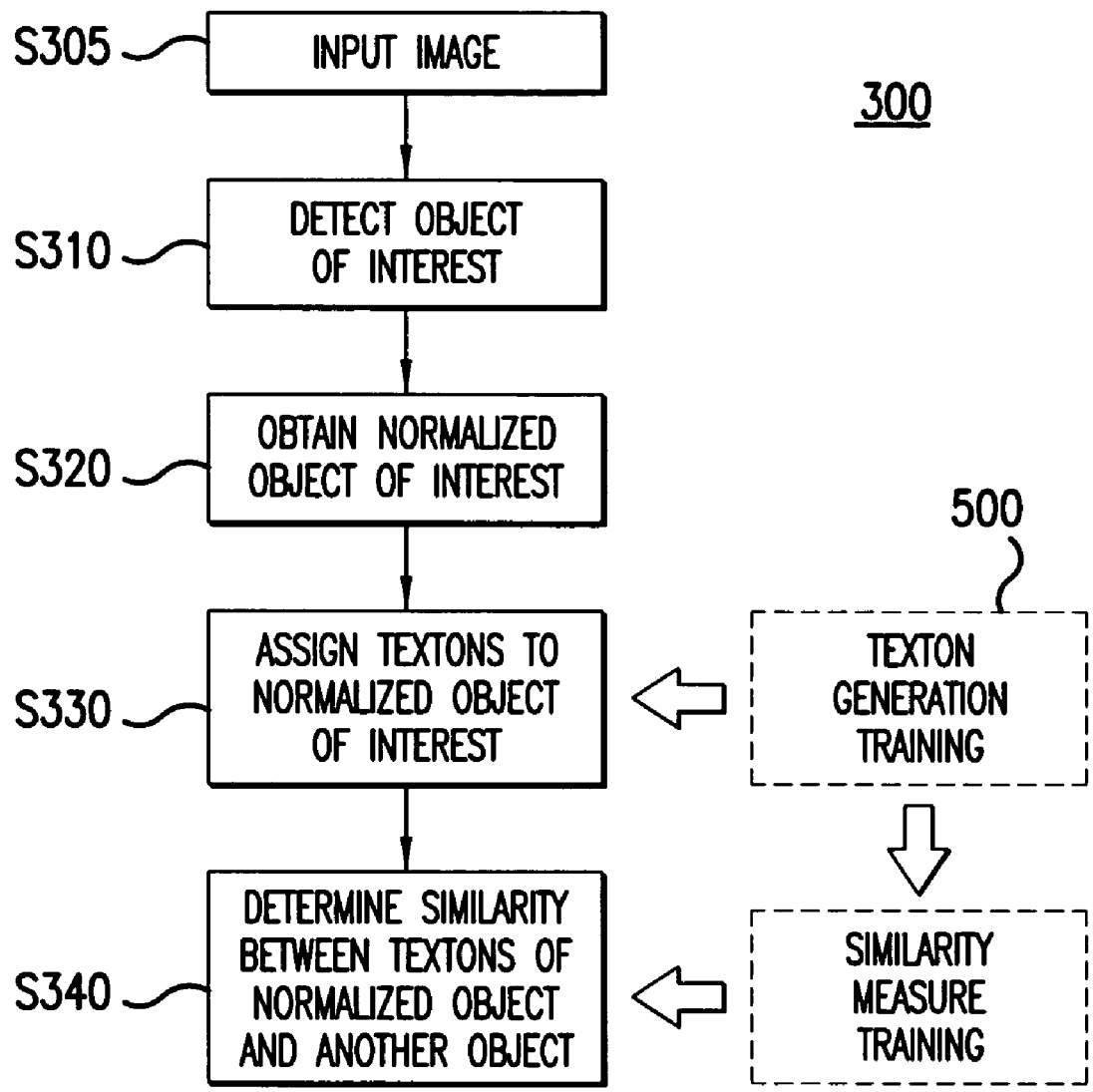
FIG. 3 is a diagram depicting an overall process flow consistent with an embodiment of the invention.

FIG. 3 depicts a top-level flow diagram for object recognition and/or verification. For simplicity of discussion, the object of interest shall be assumed to be a face; however, embodiments of the invention are in no way limited to facial objects, and the use of other objects is consistent with embodiments of the invention.

Initially, an input image containing at least one face may be provided to the image processing control unit 260 (step S305). The input image may be provided from memory 210 or directly from the image input device 110. Next, the object detection unit 220 may receive the digital image data to detect a face in the input digital image (step S310). Faces may be automatically extracted by using a trained face detector. This face detector is a classifier which determines whether the object of interest is a face or not. The features used by this classifier can be wavelet coefficients or box filter outputs. The classifier can be trained using a boosted cascade of classifiers or a neural network. Details of similar methods are described in S. Ioffe, Automatic Red-Eye Reduction, Proc. Int. Conf. Image Processing, 2003, which is incorporated herein by reference.

The normalizing unit 230 may then normalize the face detected by the object detection unit 220 (step S320). The normalization process may include determining features, such as, for example, eyes and mouth corners, in each face to normalize each face for size and/or in plane rotation. Each face may be resampled to a standard number of pixels (such as, for example, 30×30 pixels) to facilitate efficient processing of subsequent texton computations. Other normalization steps may be performed to address other imaging variations (e.g., illumination differences).

The texton processing unit 240 may then determine a texton representation of the normalized face, which can extract distinctive facial features that occur frequently (step S330). As used herein, textons may be defined as co-occurrences of filter outputs and are more fully explained in detail below. In step S330, the normalized face is essentially mapped into a texton representation. In order to accomplish this mapping, the universal texton vocabulary is utilized which is determined during texton generation training 500, described in more detail below. As stated above, the texton generation training may be predetermined offline, or it may be done during the recognition process prior to step S330. Details of the texton processing (both training and assignment) are also presented in further detail below.

Once the texton representation of the face is generated, similarity processing may be performed by the similarity detection unit 250 to compare the texton representations of the face and reference textons of other objects (step S340). In order to accomplish this task, similarity measure training may be performed to utilize the universal texton vocabulary with the other objects in order to formulate similarity measures. If facial verification is to be preformed, the reference textons of the other objects may represent the same face under different imaging conditions (i.e., similarity processing is performed over objects having intra-class differences). As used herein, facial verification automatically establishes the identity of a known subject based upon prior reference images of that subject. If facial recognition is to be performed, reference textons of the other objects may represent the same face and/or other faces under a variety of different imaging conditions. As used herein, facial recognition identifies an unknown subject through comparisons to the same and other facial objects (i.e., similarity processing is performed over objects having both intra-class and inter-class differences). In one embodiment, the similarity detection unit 250 utilizes a Texton Correlation Model. In another embodiment, Fisher Textons are used by the similarity detection unit 250. The Texton Correlation Model and the Fisher Textons are discussed in further detail below.

Texton Generation

Textons may be defined as learned co-occurrences of outputs of filters. Specifically, the filters may take the form of linear convolutional operators such as, for example, Gaussian derivative filters. Similar definitions for textons utilized in gray scale image processing have been described in "Representing and Recognizing the Visual Appearance of Materials using three-dimensional-Textons," T. Leung and J. Malik, Int. J. Computer Vision, 43(1):5-24, 1195, which is incorporated herein by reference.

Textons may encode a discrete set of local characteristic features of any 2-D image representation of a 2-D or 3-D surface which could be acquired from a real object or generated as a synthetic object (i.e., images acquired though sensors, such as, for example, digital cameras, or images generated by humans and/or computers, such as, for example, police composites of criminal suspects). The discrete set may be referred to as a texton vocabulary, wherein each element of the discrete set is an individual texton. Each pixel which forms the object of interest may be mapped to an element in the texton vocabulary. For example, if the object of interest is a face, one texton may encode the appearance of an eye, while another may encode the appearance of a mouth corner. For other objects such as a concrete structure, the textons may encode the image characteristics of a bar, a ridge, or a shadow edge. The textons may be learned from a single class of objects, such as a specific individual or structure type, thus forming a class-specific texton vocabulary, or textons may be formed from a collection of different classes, thus forming a much broader texton vocabulary.

Texton representations can have the advantage of easily characterizing changes in an image due to variations in imaging conditions. For example, if a person changes facial expressions from a smile to a frown, the texton representing the mouth corner may change. Another example may be when the illumination angle moves from a frontal direction to an oblique angle, the texton element on a particular surface may transform into a different texton. By understanding how textons change given different imaging conditions, the difficult problem of recognizing and/or verifying imaged objects collected under a wide variety of different conditions can be addressed. Texton generation includes two stages: (i) the training stage, and (ii) the assignment stage. In the training stage, a set of textons is created from a training database to form a texton vocabulary used for subsequent recognition and/or verification processing. In the assignment stage, a texton representation of an image is generated using the texton vocabulary. Details of the training stage and the assignment stage are presented below.

Figure 4:
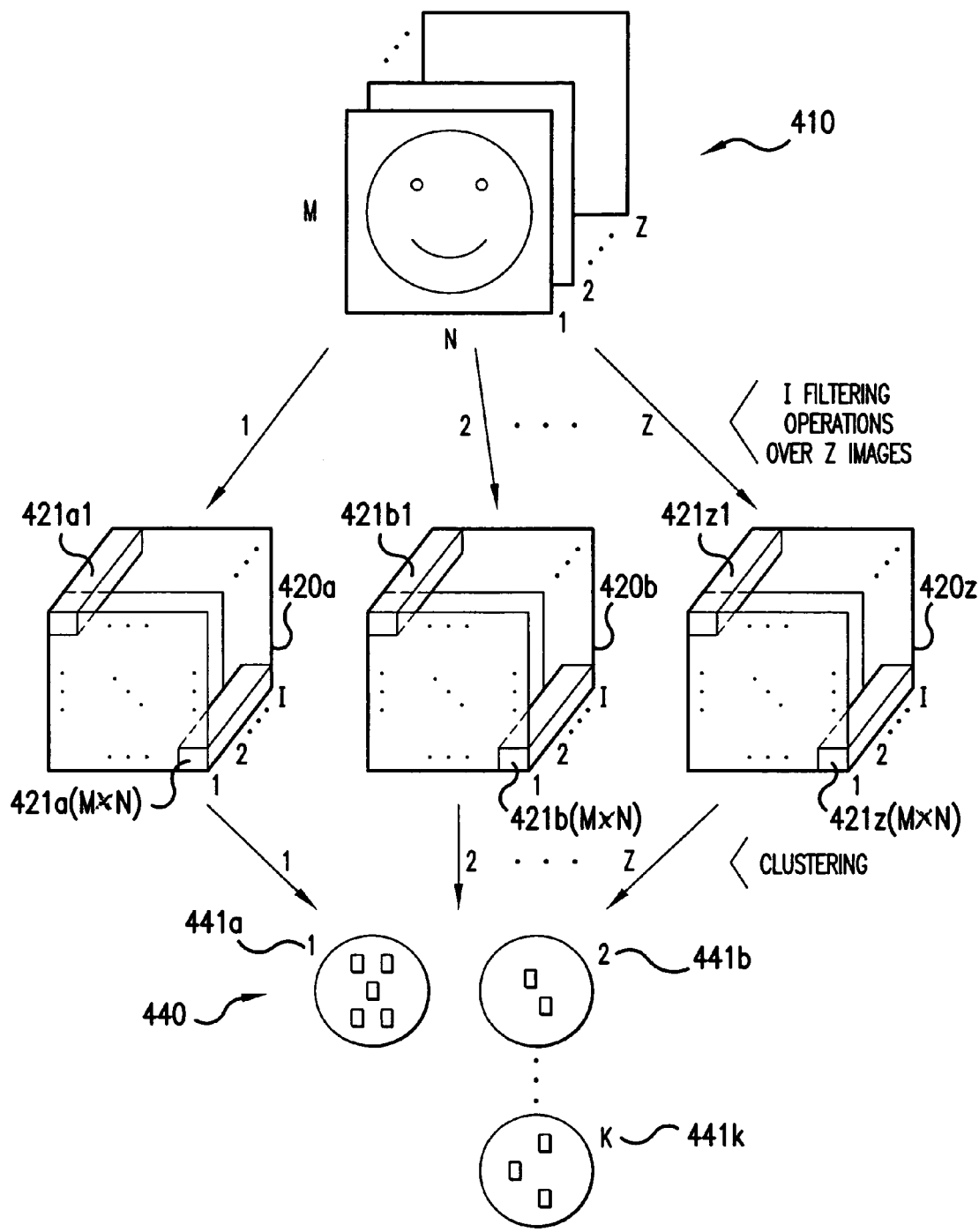
FIG. 4 is an explanatory illustration depicting the basics of the training stage of texton generation consistent with an embodiment of the present invention.

FIG. 4 shows an explanatory diagram depicting the basics of the training stage of texton generation consistent with embodiments of the present invention. This diagram shows how the universal texton vocabulary is acquired from training data. During this stage, filtering is applied to the database of training examples. The resulting filter responses are clustered to K different groups. The process may begin with a plurality, Z, of reference images containing a representations of normalized reference objects 410 which will be used as a basis of comparison against a normalized object image 610. Each of the Z normalized reference object image 410 may have M×N pixels (i.e., M row pixels by N column pixels). Values for M and N can be chosen to maximize processing speed while retaining image fidelity. Practical values for M and N may be, for example, M=30 and N=30. One normalization process which may be used was previously described above in greater detail; however, one of ordinary skill in the art would appreciate that other normalization processes may be used, as long as the images containing the objects of interest and objects to which they are compared have consistent attributes prior to subsequent texton generation and recognition/verification processing.

Each normalized reference object image 410 may then be filtered by a plurality of filters, whereby the number of filters may be represented by I, to produce I filter responses 420a-z, for each of the Z normalized reference object images. Each of the filter responses 420a-z may be images containing approximately M×N pixels. The number of pixels in the filter responses 420a-z may be slightly different that the number of pixels in the normalized object image 410 due to filter overhang. Details of the filters used to produce the filter responses 420a-z are described below with reference to FIG. 5.

After the filtering operation, the data comprising the I filter responses 420a-z may be rearranged into a plurality of filter response vectors. There may be approximately M*N filter response vectors for each of the Z normalized reference object images. Each filter response vector $421a_1$-$421z_{(M*N)}$ may have a length of I, and corresponds uniquely to each pixel in its respective normalized object image 410. One may note that each filter response vector is pooling information from varying groups of pixels depending on the scales of the filters. However, each filter response vector corresponds uniquely to each pixel, because the filter response vectors will vary at different pixels since they are generated from different pixel groups.

So for each image in the plurality of normalized reference object images 410, the filter response vectors are formed. For example, in the first normalized reference object image (labeled 1 in group 410 as shown in FIG. 4), filter response vectors $421a_1$-$421a_{(M*N)}$ are formed. There are Z normalized reference object images 410 in the database which may correspond to multiple classes of objects, each with multiple images. For face recognition, the database may contain a number of people, each with multiple images corresponding to different imaging conditions. In total, these (M×N×Z) filter response vectors may be clustered into K distinct groups. Each individual grouping may be referred to as a texton, and is representative of a prototypical feature in the normalized object image database. The entirety of textons is collectively referred to as a texton vocabulary 440. When a texton vocabulary 440 is obtained from the database containing multiple classes, it may be called a universal texton vocabulary. The universal texton vocabulary can represent the features of any images of the objects of interest. For faces, the universal texton vocabulary will provide good representation for any person, whether he/she is present in the training database or not. Each texton in the texton vocabulary 440 may be associated with labels, referred to as texton labels 441a-441K, for uniquely identifying each texton. The filter response vectors $421a_1$-$421z_{(M*N)}$ are clustered based upon their similarity to each other, and each filter response vector is only assigned to one texton. For example, as shown in FIG. 4, the texton associated with texton label 1 (441a) contains five distinct filter responses, which represent a particular unique feature in the normalized reference object images 410. The clustering may be performed by appropriate clustering algorithms known to those skilled in the art, such as, for example, a K-means algorithm, which is described in more detail below. The number of textons, herein represented by K, in the texton vocabulary 440 may be chosen based upon the complexity of the objects of interest which may vary or stay constant depending on the object and application. The generation of the texton vocabulary is performed at the training stage, which may be done in advance once, or can be a continuous incremental process.

Figure 5:
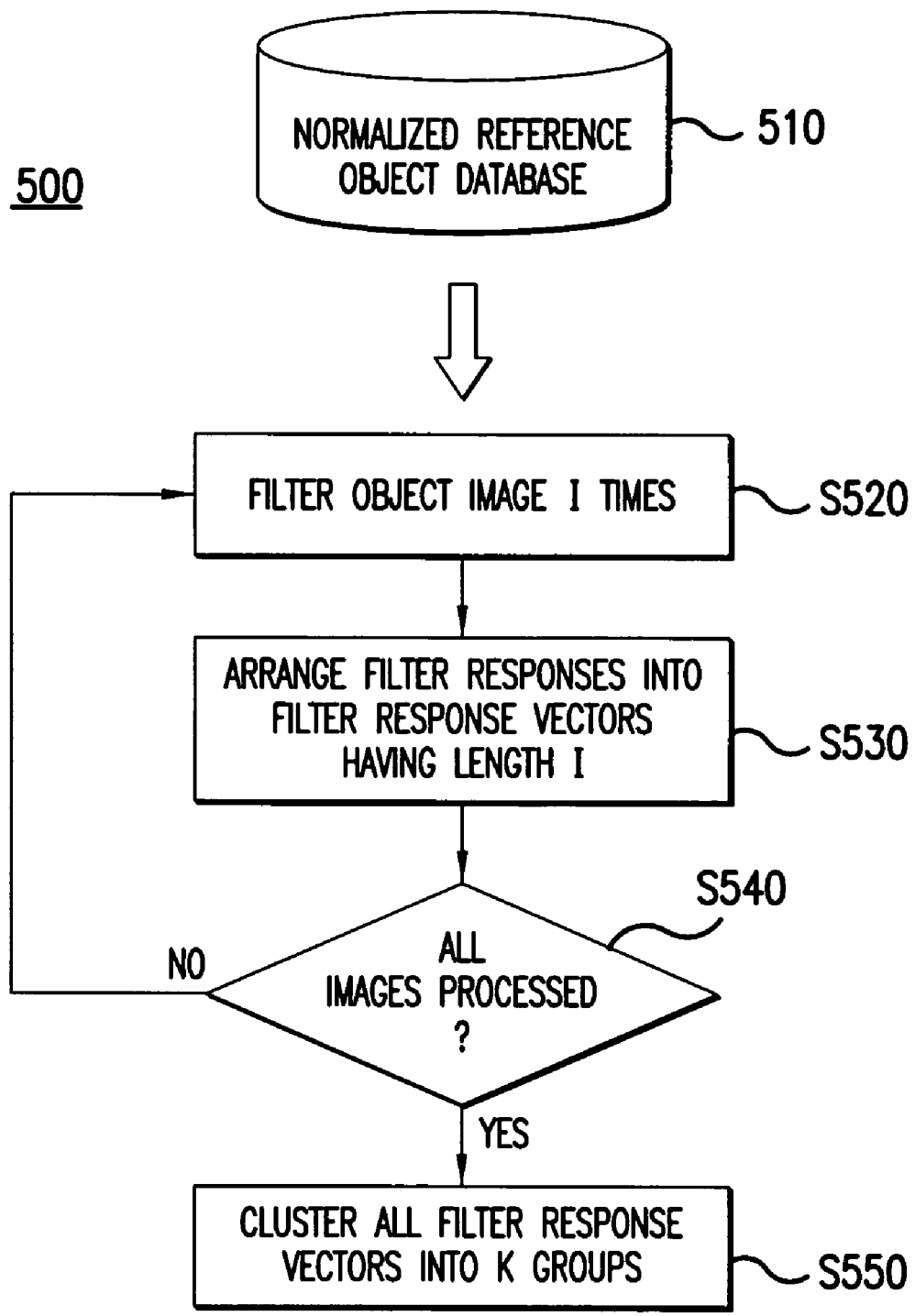
FIG. 5 is a diagram depicting the process flow for the training stage of texton generation consistent with an embodiment of the present invention.

FIG. 5 is a flow diagram showing the training stage of the texton generation process in more detail. The process utilizes a normalized reference object database 510 which is a training database, populated with the plurality of normalized reference object images 410. The normalized reference object images 410 are generated from images containing objects of interest which have had the objects extracted and normalized through processes which may be similar to steps S310 and S320 as discussed above and shown in FIG. 3. A first normalized object image from the database 510 is filtered I times using a plurality of separate filters using texton processing unit 240 (step S520). The filters may be any type of filter known to one of ordinary skill in the art. In an embodiment consistent with the present invention, the filters may be linear filters applied to each of the normalized reference object images 410 using convolutional methods. The particular choice of filter may not be highly critical, and can be selected for simplicity of implementation and computational efficiency. Further efficiencies may be gained by selecting separable type filters.

In one embodiment, texton processing unit 240 may utilize a plurality of linear Gaussian derivative filters. These filters may be represented as separable horizontal and vertical derivatives of a circular symmetric Gaussian filter. Mathematically, these filter may be represented by the following equations, where F, and $F_h$ are the separable vertical and horizontal derivative filters, respectively, x and y represent pixel locations, and σ represents the scale factor of the filters:

$$F_V(\sigma) = \frac{d}{dx} G_\sigma(x, y)$$

$$F_H(\sigma) = \frac{d}{dy} G_\sigma(x, y)$$

$$G_\sigma(x, y) = \frac{1}{2\pi\sigma} \exp\left(-\frac{x^2 + y^2}{2\sigma}\right)$$

Any number of different filter scalings may be used, which in turn can impact the total number of filters used in the filtering operations. For example, four different size scalings can be used which will result in a total of eight different filters (i.e., I=8).

The multiple filtering operations performed by texton processing unit 240 determine the number (I) of filtered images 420. After filtering, the I filtered images are rearranged by the texton processing unit 240 into the plurality (M*N) of filter response vectors, each having length I (step S530). This process is repeated until every normalized reference object image in the training database 510 has been filtered (step S540).

Further referring to FIG. 5, texton processing unit 240 may then cluster all of the filter response vectors $421a_1$-$421z_{(M*N)}$, M*N*Z of them, into individual K textons, forming the texton vocabulary 440 (step S550). Clustering may be performed by a K-means clustering algorithm. The K-means clustering algorithm can generate a specified number (K) of disjoint, non-hierarchical groups which do not overlap. The value K may be determined by the complexity of the objects of interest. It could also be determined by computational efficiency requirements or user preference. The K-means algorithm is typically an iterative numerical algorithm and is described in more detail in "Pattern Classification," R. Duda, P. Hart and D. Stork, Wiley 2001, which is incorporated by reference.

One of ordinary skill in the art would appreciate that texton processing unit 240 may use other known clustering algorithms in step S550.

Figure 6:
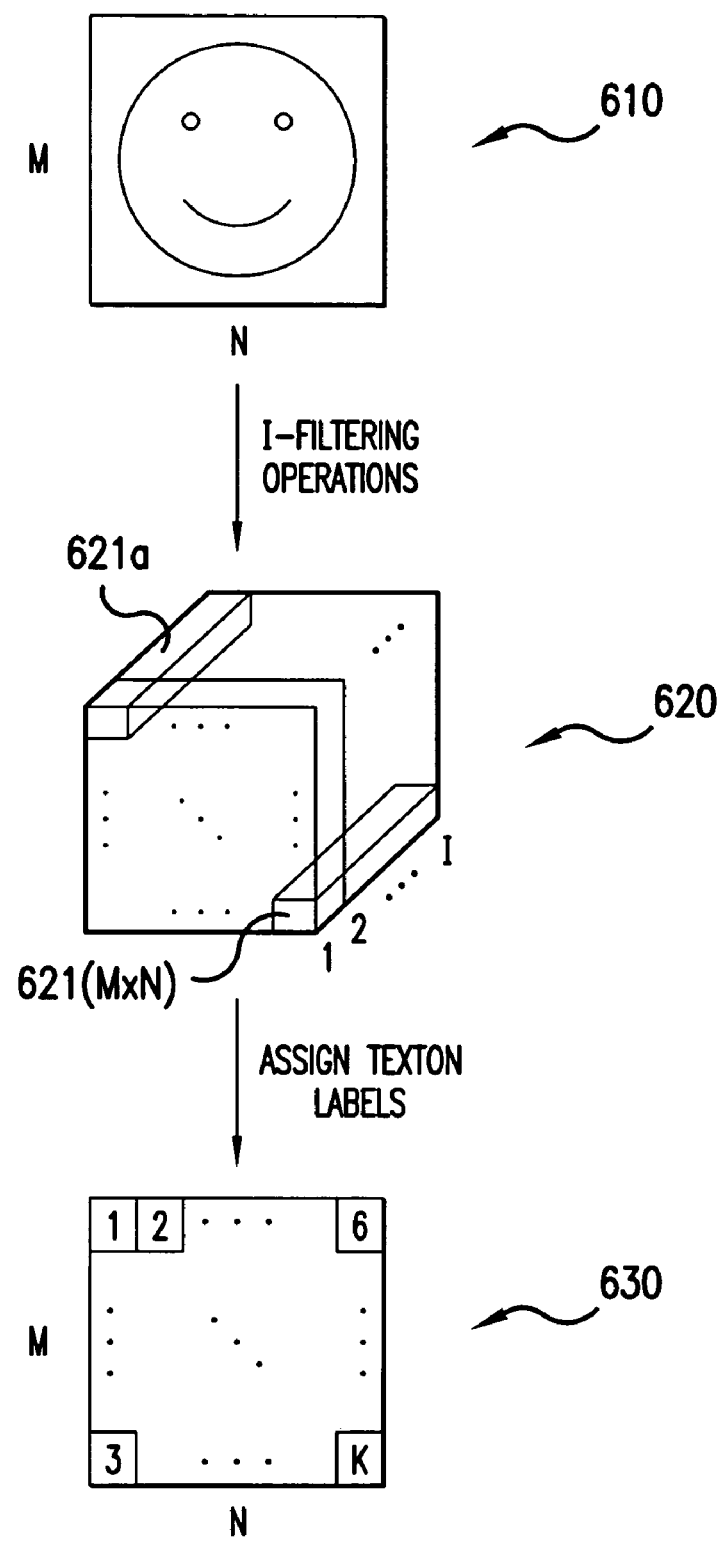
FIG. 6 is an explanatory illustration depicting the basics of the texton assignment stage of texton generation which is consistent with an embodiment of the present invention.

FIG. 6 is an explanatory illustration depicting the basics of the assignment stage of texton generation. After the (N*M*Z) filter response vectors $421a_1$-$421z_{(M*N)}$ are clustered into textons to form the texton vocabulary 440, texton labels 441a-K can be assigned to any normalized object image of interest and then be arranged in an M×N texton label array.

A normalized object of interest image 610 is obtained from an input image by initially extracting an object of interest and subsequently normalizing the image. The extraction and normalization may be performed using the similar techniques described above in steps S310 and S320, respectively, as shown in FIG. 3, by object detection unit 220 and normalizing unit 230, respectively. The normalized object of interest image 610 is then filtered I times to form I filter response images 620. The filter response images 620 are rearranged into M*N filter response vectors 621a-621(M*N), using methods similar to those described above for FIG. 4. The filter response vectors 621a-621(M*N) then are assigned into a texton array 630. The positions in the texton label array 630 correspond directly to the pixels in the normalized object image 610. The value corresponding to each pixel may be 1-K, depending upon which texton in the texton vocabulary 440 best describes the local surface characteristics of that pixel. Thus, the texton label array is an M×N image wherein each pixel has an integer value which identifies each texton in the texton array 410.

Figure 7:
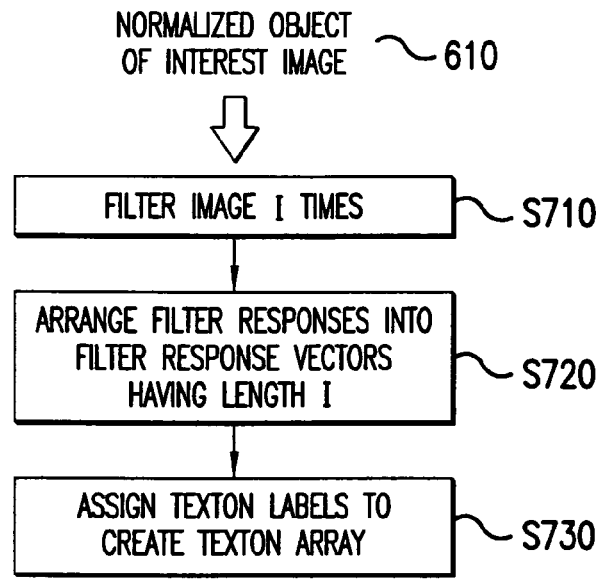
FIG. 7 shows the process flow for the texton assignment stage for texton generation which is consistent with an embodiment of the present invention.

FIG. 7 shows the process flow for the assignment stage for texton generation which is consistent with embodiments of the present invention. Normalized object of interest image 610 is filtered by the texton processing unit 240 (step S710). The filtering may be typically performed using the same filter in a similar manner as described above in FIG. 5. Texton processing unit 240 then rearranges the filter response images 620 into filter response vectors 621a-621(M*N) in a similar manner as described above in FIG. 5 (step S720). In step S730, texton processing unit 240 maps the filter response vectors 621a-621(M*N), which are associated uniquely with each pixel in the normalized object of interest image 610, to the closest texton within the texton vocabulary 440. This mapping may be accomplished by determining which texton minimizes the Euclidian distance between the filter response vector. Other distance metrics known to those skilled in the art may also be used. Texton processing unit 240 may then assign the texton label corresponding to each of the mapped textons to each respective pixel location thus creating the texton array 630 (step S730).

Similarity Determination

Once the textons have been generated for the normalized object of interest 410, their similarity may be compared to other textons of other inter-class or intra class objects of interest. The task now becomes, given two images of interest, determine whether they belong to the same object or not. In the problem of face recognition and verification, the task is to determine whether the two face images belong to the same person or not. Two approaches consistent with embodiments of the invention, herein referred to as Texton Correlation Modeling and Fisher Textons, are described in detail below. However, one of ordinary skill would appreciate that other techniques may be used in conjunction with texton representations of imaged objects to perform object recognition and/or verification.

Texton Correlation Model

One approach allowing the comparison of objects imaged under different conditions may be to develop models which represent the texton transformations resulting from varying imaging conditions. Such models may allow recognition and/or verification within an object class, that is, for example, as illumination, pose, and etc. change. Texton Correlation Modeling is a probabilistic approach which may determine how objects change their appearance under varying imaging conditions, and recognize faces from a single image of a person under varying conditions, such as, for example, a wide range of illuminations, poses, and also after many years of aging. There are two different stages of Texton Correlation Modeling. The first stage may be regarded as training and the second stage as recognition. In the training stage, two conditional probability tables are learned from a database on images of objects. In the case of face recognition and verification, this database may contain facial images of different people. These learned probability tables may then be applied to other instances of the objects of interest. For faces, these probability tables may tell us how similar two facial images are and thus provide a similarity measure as to how likely they come from the same person. In the recognition stage, the probability tables are used to determine the likelihood that object representations contained in two distinct images were created by the same object.

Figure 8:
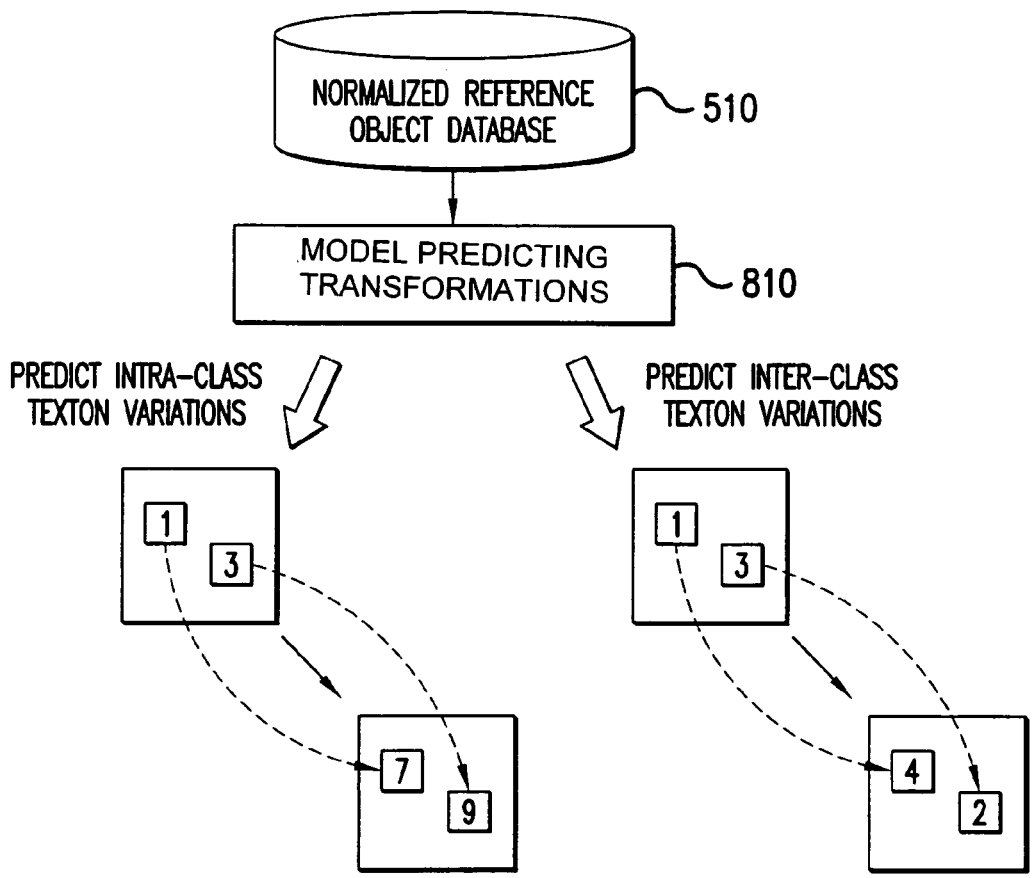
FIG. 8 depicts the basics of the recognition stage for the Texton Correlation Model consistent with an embodiment of the present invention.

FIG. 8 is an explanatory illustration depicting the basics of learning the probability tables in the Texton Correlation Model (i.e., the training stage). Texton Correlation Modeling learns intrinsic transformations which are valid for all the instances within an object class. In the context of face recognition, the intrinsic transformations may be learned from a large group of properly normalized facial images. The facial images may be contained the normalized reference object database 510. Database 510 may contain a large set of reference objects, each may be imaged over a range of variations of interest. In the case of faces, this database may contain a large set of different people, with multiple pictures including different light conditions, pose, age, facial expressions, and etc. The identities of these objects (such as, for example, specific people) are typically known. Intrinsic variations within a single person and differences between individuals may be captured in a single model 810. The model 810 essentially predicts two things: (1) how textons may change for the different variations that may take place within an object class; and (2) how textons may change between any two object classes. Once these transformations are learned, they can be applied to any novel group of subjects, and recognition can be achieved from a single image of a subject of interest across the modeled intra-class variations. More specifically, given any two face images, the model will predict the likelihood that they come from the same individual versus the likelihood that they come from two different people. Comparing these two likelihood values will tell us whether the individuals from these two photos are identical or not.

The following section analytically describes how the model is generated consistent with an embodiment of the present invention. Let M designate the normalized object image of an object of interest (i.e., the "model"), for example, M may be a face of an individual to recognize for facial recognition. M is Let I be an incoming object image which has been normalized (i.e., the "probe"). The task of facial recognition may be to determine whether I is the same object as M.

$T_M$ may represent the texton assignment for object M and $T_I$ may represent the texton assignment for object I. $P_{same}(T_I|T_M)$ may be the probability that I is the same object as the model object M, and $P_{diff}(T_I|T_M)$ may be the probability that I is a different object as the model object M. A likelihood ratio, which may be used to determine if they are the same object, may be defined as:

$$L(T_I \mid T_M) = \frac{P_{same}(T_I \mid T_M)}{P_{diff}(T_I \mid T_M)}$$

The likelihood ratio may be used as a similarity measure between an image and the model. This may be accomplished by establishing a threshold for $L(T_I|T_M)$ to determine whether the face matches the model, or as a classification, assign the incoming image to the class with the highest likelihood ratio score L.

In order to compute the likelihood ratio, $P_{same}(T_I|T_M)$ and $P_{diff}(T_I|T_M)$ may be determined. These two functions may be learned from the training database of objects. An assumption that the texton labels are independent of location may be used to simplify this calculation as follows:

$$P_{same}(T_I \mid T_M) = \prod_x P_{same}(T_I(x) \mid T_M(x))$$

$$P_{diff}(T_I \mid T_M) = \prod_x P_{diff}(T_I(x) \mid T_M(x))$$

where "x" denotes each "pixel" location in the texton array.

The discrete nature of textons may allow the above probabilities to be determined exactly without making simplifying assumptions such as, for example, assuming Gaussian distributions. $T_I(x)$ is an element of the texton vocabulary and may be scalar valued. That is, $T_I(x) \in \{1 \ldots K\}$. Recall that the texton vocabulary is universal and applies to all objects. This means that $TM(x) \in \{1, \ldots K\}$ as well. Given a texton vocabulary size of K, $P_{same}(T_I(x)|T_M(x))$ and $P_{diff}(T_I(x)|T_M(x))$ may each be represented completely as a K×K conditional probability table. Both of these probability tables are hereinafter referred to as a conditional texton distribution model, which may be completely learned through the training data contained in the normalized reference object database 510. The details of computing this table are presented below.

Let a training set (which may be all of the images contained in the normalized reference object database 510, or some subset thereof) containing a plurality of normalized objects be T. Let $C_M$ be the set of all training data that belong to the same class as M. Let a,b ∈ $\{1, \ldots, K\}$ be two texton elements in the vocabulary. The entries in the K×K probability table may be accumulated as follows (note that the x dependency is implied implicitly to simplify the notation):

$$P_{same}(T_I = a \mid T_M = b) = \frac{1}{Z_1} \sum_{M, I \in T} 1_{(a,b,C_M)}(T_I, T_M, I)$$

$$P_{diff}(T_I = a \mid T_M = b) = \frac{1}{Z_2} \sum_{M, I \in T} \overline{1}_{(a,b,C_M)}(T_I, T_M < I)$$

$Z_1$ and $Z_2$ are normalizing constants to make $P_{same}$ and $P_{diff}$ probabilities. The function $1_{(a,c,C_M)}(T_I, T_M)=1$ if $T_I=a$, $T_M=b$, I ∈ $C_M$ and 0 otherwise. $\overline{1}_{(a,c,C_M)}(T_I, T_M)=1$ if $T_I=a$, $T_M=b$, I ∉ $C_M$ and 0 otherwise. In other words, what $P_{same}(T_I=a|T_M=b)$ means is that, at each pixel location "x", we count the number of times the texton a occurs in $T_I$ and the texton b occurs in $T_M$ for all pairs of face images I and M in the database that belong to the same person. Similarly, $P_{diff}(T_I=a|T_M=b)$ refers to the count when the face images I and M belong to two different people.

These two conditional probability tables are learned from the training set from the normalized reference object database 510. However, they may be applied to any pair of objects within or outside the database. They represent the intrinsic variations occurring between a pair of same or different objects under varying imaging conditions. Applying these two learned conditional probability tables to the likelihood ratio $L(T_I|T_M)$, the similarity between any model and any incoming image can be computed.

It can be noted that the training set may be used to learn these two probability tables. Once learned, the training set can be discarded. These two probability tables are learned only once, typically offline. During actual face recognition and verification, only the texton labels for the model image and probe image are computed. For any image (model or probe), it is first filtered using the set of filters. Each pixel becomes a vector of filter responses. The texton label is assigned to each filter response based on the Euclidean distance between the filter response at the pixel to the filter outputs of the texton vocabulary. In other words, after texton assignment, each image (e.g. 30×30) becomes a 30×30 matrix of integers. Each element in the matrix takes the scalar value of 1 to K.

Figure 9:
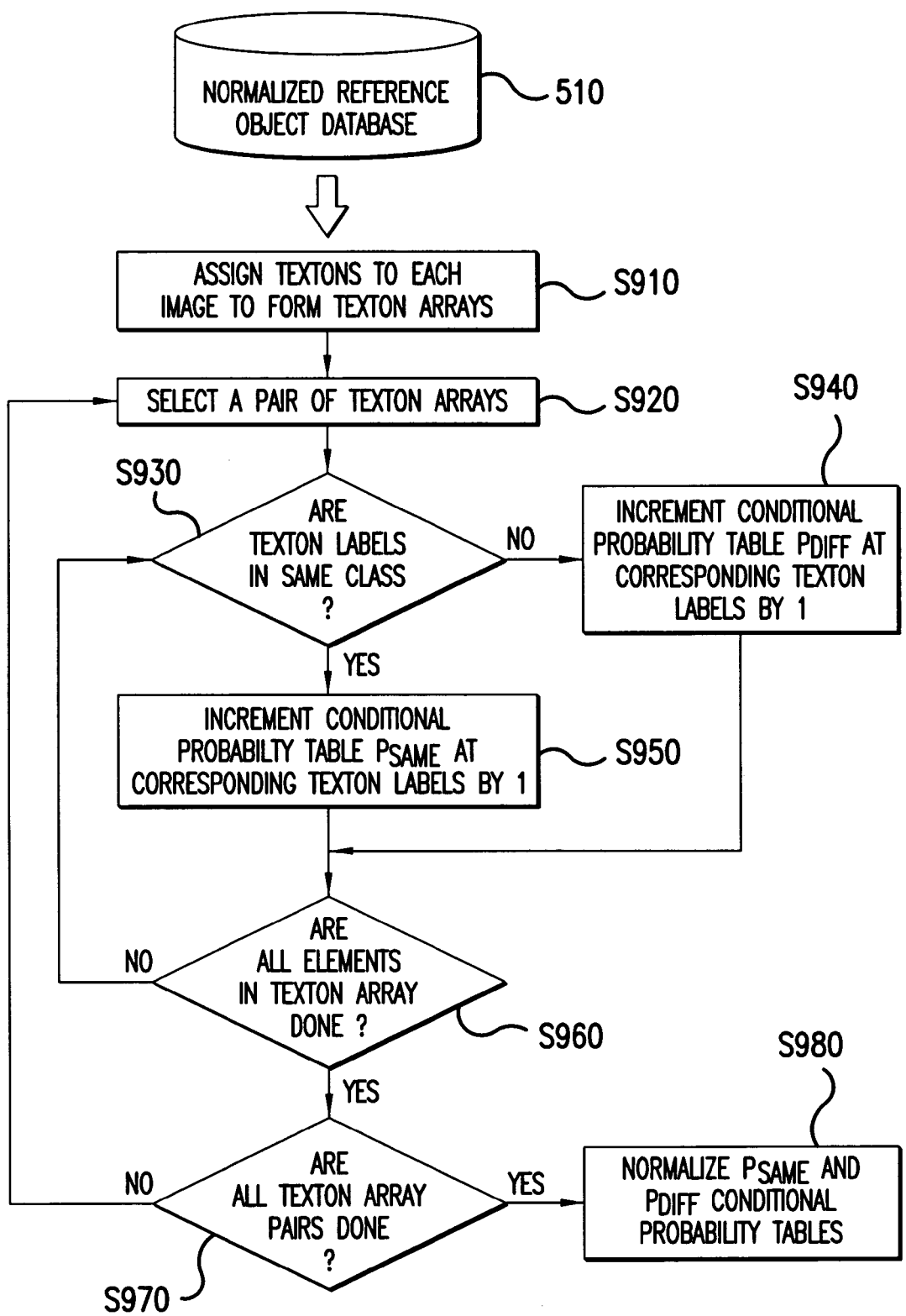
FIG. 9 shows a process flow for the training stage of the Texton Correlation Model consistent with an embodiment of the present invention.

FIG. 9 shows a process flow for the training stage of the Texton Correlation Model consistent with an embodiment of the present invention. During this process, the conditional texton distribution model may be realized in the form of two conditional probability tables. The training stage initially utilizes images contained a training database which may be populated with the plurality of normalized reference object images (i.e., the normalized reference object database 510). Texton processing unit 240 may assign textons to each image within the normalized reference object database 510, or some subset thereof, to form texton arrays (step S910). The texton processing unit 240 may use the method in the assignment stage of texton generation as discussed above. Similarity determination unit 250 then selects a pair of texton arrays (step S920). At each location in the texton array pair, similarly determination unit 250 checks to see if the texton labels are in the same class using the known identity information. If the texton labels are not in the same class, similarity determination unit 250 increments the element corresponding to the texton labels being compared in the conditional probability table $P_{diff}$ by one (step S940). If the texton labels are in the same class, the elements corresponding to the texton labels in conditional probability table $P_{same}$ is incremented by one (step S950). Similarity determination unit 250 repeats this process for the texton array pair until all of the individual textons within the pair (i.e. "pixels") have been processed (step S960). Once this is completed, similarity determination unit 250 selects a new pair of texton arrays, and repeats the process until all of the texton array pairs generated from the images in the normalized reference object database have been processed (S970). At this point, similarity determination unit 250 normalizes the entries in the conditional probability tables (step S980).

Figure 10:
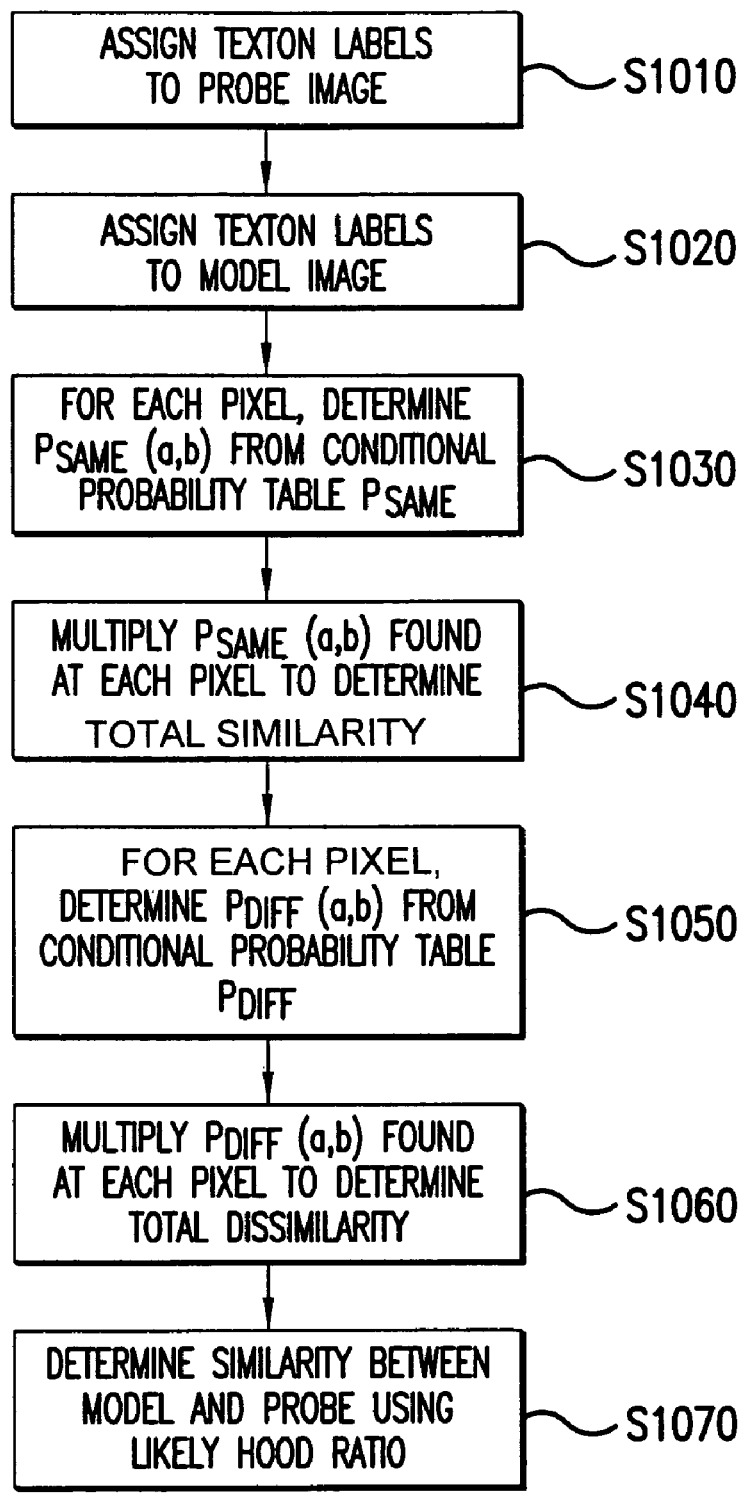
FIG. 10 shows a process flow for the recognition stage of the Texton Correlation Model consistent with an embodiment of the present invention.

FIG. 10 shows a process flow for the recognition stage of the Texton Correlation Model consistent with an embodiment of the present invention; which illustrates how the learned conditional probability tables in the Texton Correlation Model may be used to determine the similarity of two facial images. Initially, the probe image and the model image are mapped to the corresponding texton representation (steps S1010 and S1020). Each image is now transformed into a matrix of integers (e.g. 30×30), with each element belonging to a member of the texton vocabulary, i.e. $T_M(x)=a \in \{1, \ldots, K\}$ and $T_I(x)=b \in \{1, \ldots, K\}$, where K is the size of the texton vocabulary. For each location "x", $P_{same}(a,b)$ is read out from the learned probability table (step S1030). The total similarity across the whole image, $P_{same}$, is obtained by multiplying the individual values across all locations "x" (step S1040).

Likewise, for $P_{diff}$ at each location "x", $P_{diff}(a,b)$ is read out from the corresponding learned probability table (step S1050). The total dissimilarity across the whole image, $P_{diff}$, is obtained by multiplying the individual values across all locations "x" (step S1060). The likelihood that the two images under consideration come from the same person is obtained by dividing the two measures as in: $P_{same}/P_{diff}$ (step S1070).

Fisher Textons

The conditional texton distribution model presented above may make the assumption that texton assignments are independent of location. This is typically not an accurate assumption. For example, the appearance of a left eye and a right eye are obviously correlated. However, this assumption allows the likelihood ration to be computed efficiently. Fisher Textons do not discount the correlations between features of objects. Specifically, Fisher Textons take into account second order correlations (i.e., locational correlations are captured up to second order). However, imaging condition correlations are captured only up to second order as well. On the other hand, the conditional texton distribution model sacrifices location dependencies to capture the exact texton distributions under changing imaging conditions.

There are two stages in Fisher Texton modeling. The first stage is training. In the training stage, using the database of objects of known identities, a set of linear projection vectors is to be computed. These projection vectors are called the Fisher Textons. The Fisher Textons are chosen so that they discriminate between different individuals well. The training stage is usually performed in advance. However, the stage may be performed during recognition and/or verification, and previously determined Fisher Textons can be updated continuously as well. The second stage is recognition. In this stage, any normalized object image is projected onto the Fisher Textons. The distance between the projections of two normalized object images will be used to encode the similarity of the two images.

Figure 11:
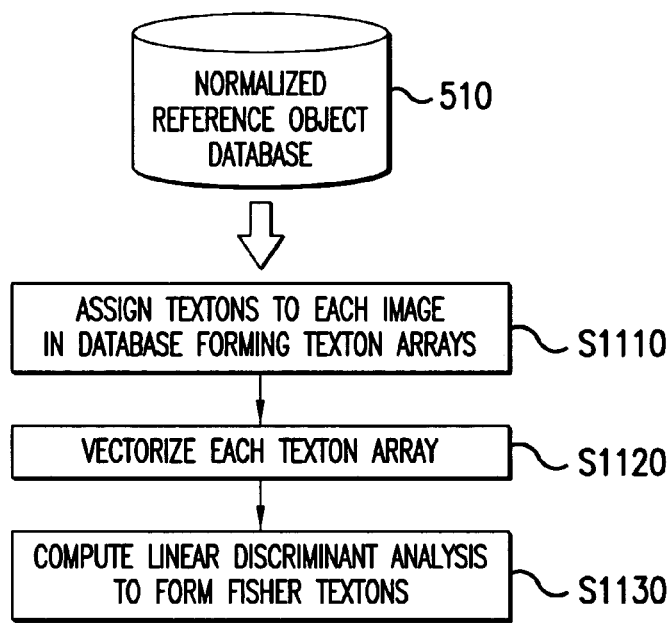
FIG. 11 shows a process flow for the training stage of the Fisher Textons consistent with an embodiment of the present invention.

FIG. 11 shows the process flow of training stage of Fisher Textons consistent with embodiments of the present invention. As previously described above, after texton assignment (once the texton array has been formed), every object in the training set is transformed to an M×N texton array, where typical values may be M=N=30 (step S1100). Each element in this array $T_I(x)$ takes on a value between 1, . . . , K, where K is the size of the texton vocabulary at each element. Typical values for K may be approximately 8-10. Each element in the texton array may be transformed into an indicator vector of length K: $[0, \ldots, 0, 1, 0, \ldots, 0]$ with one at the $k^{th}$ element if $T_I(x)=k$ (step S1120). The indicator vectors are then concatenated together so the texton array is represented by one (M*N*K) dimensional vector (e.g., using the typical values above, the vector has a dimension of 9000) (step S1120).

A Fisher linear discriminant analysis is then performed on these vectors, obtained from the normalized images in the training database, to obtain projection directions which are best for separating objects among different classes (for face recognition, this process finds vectors which best separate faces from different people) (step S1130). These projection vectors are called Fisher Textons. The Fisher linear discriminant is described in more detail in "Pattern Classification," R. Duda, P. Hart and D. Stork, Wiley 2001, which is incorporated herein by reference. One of ordinary skill in the art will appreciate that other discriminant analysis techniques may also be used.

Determining the Fisher Textons initially proceeds with computing a within-class scatter matrix using the following equations:

$$S_w = \sum_{i=1}^{c} S_i$$

$$S_i = \sum_{x \in C_i} (x - m_i)(x - m_i)^t$$

$$m_i = \frac{1}{n_i} \sum_{x \in C_i} x$$

Here, c is the number of classes and $C_i$ is the set of training examples belonging to class i. Moreover, $n_i = |C_i|$ and $n = \sum_i^c n_i$. The between-class scatter matrix is defined as:

$$S_b = \sum_{i=1}^{c} n_i (m_i - m)(m_i - m)^t$$

where m is the total mean vector:

$$m = \frac{1}{n} \sum_{i=1}^{c} n_i m_i$$

The objective then is to the value of matrix V which maximizes the following criteria function:

$$J(V) = \frac{|V^t S_b V|}{|V^t S_w V|}$$

The columns of the optimal matrix V vector are the generalized eigenvectors to the largest eigenvalues in the following equation:

$$S_b v_i = \lambda_i S_w v_i$$

The vectors $v_i$ are the projection directions (i.e., the Fisher Textons) which capture the essential information to classify objects among different classes. The idea is that when a large numbers of training examples are used, the $v_i$'s can distinguish between people which may not be those present in the training set.

Figure 12:
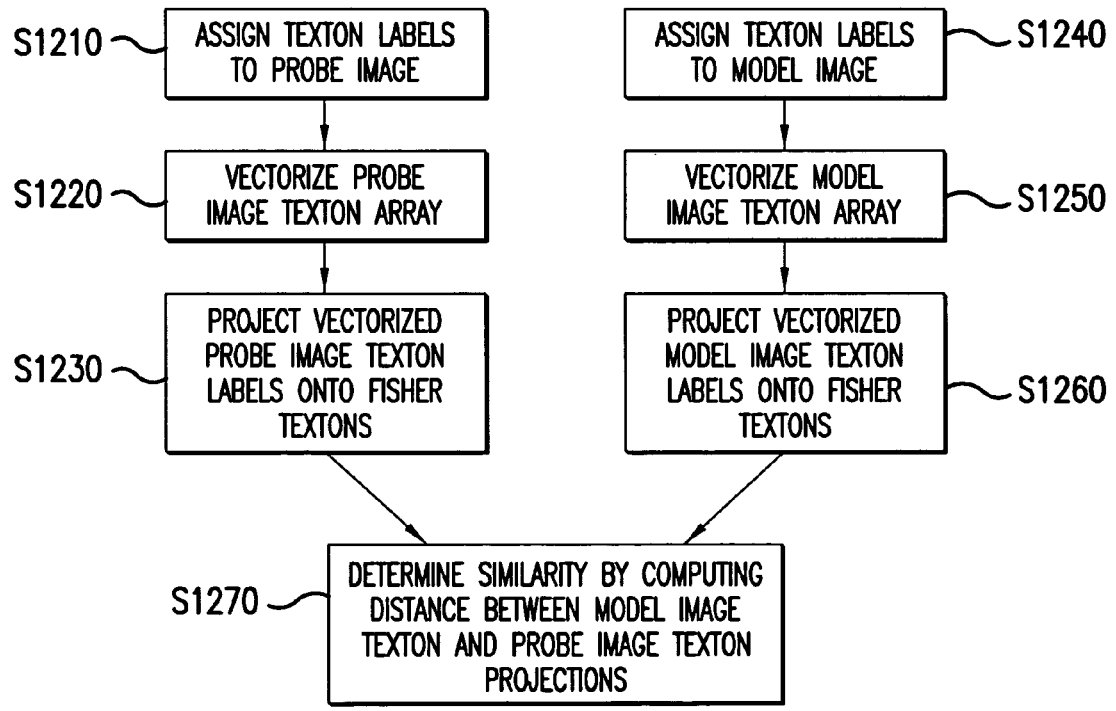
FIG. 12 shows a process flow for the recognition stage of the Fisher Textons consistent with an embodiment of the present invention.

FIG. 12 shows a process flow for the recognition stage of the Fisher Textons consistent with an embodiment of the present invention. Once the Fisher Textons are found, they can be used for recognizing any objects such as, for example, faces, whether they are present in the training database or not. The recognition stage starts with assigning the texton labels to a normalized incoming object image (i.e., the "probe image" to be recognized) (step 1210). Each probe image containing a normalized object may be transformed to its texton representation, which may be vectorized as described above step S1220). The vectors may then projected onto the Fisher Textons $v_i$'s (step S1260). The recognition stage may then proceed by also assigning the texton labels to a normalized object image of the object of interest (i.e., the "model image" for which comparisons may be made against.) (step S1240). Each model image may also has its textons vectorized (step S1250). These vectors may also be projected onto the Fisher Textons $v_i$'s (step S1260). Comparisons between the objects found in the probe image and the model image may be determined by computing, for example, the Euclidean distance between the projections of the "probe vectors" as determined in step S1230) and the projections of the "model" vectors determined in step S1260 (step S1270). Comparisons of the Euclidean distances using other probe images may be made, and the one which minimizes this distance may be determined as "matching" with the model image. Other metrics known to those skilled in the art may also be used to make the comparison.

Although detailed embodiments and implementations of the present invention have been described above, it should be apparent that various modifications are possible without departing from the spirit and scope of the present invention.

What is claimed is:

1. A method for automatically recognizing objects in digital image data, comprising:
   detecting an object of interest in input digital image data;
   obtaining a normalized object of interest;
   assigning texton representations of the normalized object of interest to produce a first a texton array;
   determining a similarity between the texton representations and previously determined texton representations of at least one other object;
   detecting and normalizing a plurality of reference objects from a plurality of images;
   obtaining a first plurality of filter responses based upon pixels forming the plurality of normalized reference objects;
   forming a first plurality of vectors based upon the first plurality of filter responses; and
   clustering the first plurality of vectors into a plurality of groups, wherein each group is assigned a texton label.

2. The method according to claim 1, further comprising:
   obtaining a second plurality of filter responses based upon pixels forming the normalized object of interest;
   forming a second plurality of vectors based upon the second plurality of filter responses; and
   creating a first texton label array by assigning the texton labels to each of the pixels forming the normalized object of interest.

3. The method according to claim 2, wherein the first and second plurality of filter responses are obtained using horizontal and vertical derivatives of a plurality of circular symmetric Gaussian filters, further wherein the plurality of circular symmetric Gaussian filters comprise a plurality of scales.

4. The method according to claim 3, wherein the circular symmetric Gaussian filters are separable.

5. The method according to claim 3, wherein the each of the first and second plurality of vectors has a length based upon the number of filters used to obtain the first and second filter responses.

6. The method according to claim 1, wherein the clustering further comprises a K-means clustering algorithm.

7. The method according to claim 1, further comprising:
   forming a plurality of texton arrays from images belonging to a training set taken from the plurality of normalized reference objects;
   selecting a pair of texton arrays from the plurality of texton arrays;

determining, for each element in the pair of texton arrays, whether a texton label pair are in a same class;
incrementing an element by one in a first conditional probability table based upon the determining finding the texton label pair are in the same class;
incrementing an element by one in a second conditional probability table based upon the determining finding the texton label pair are in a different class;
repeating the selecting, the determining, and each incrementing until all of the texton array pairs have been processed; and
normalizing the first and second conditional probability tables.

8. The method according to claim 7, wherein the training set is based upon in-class image variations.

9. The method according to claim 8, wherein the training set is based upon images of the same reference object under different imaging conditions.

10. The method according to claim 7, wherein the first and second conditional probability tables are computed based upon the assumption that texton labels are independent of location in a reference object from said plurality of reference objects.

11. The method according to claim 7, wherein the similarity measure is based upon a likelihood ratio of the first and second probabilities.

12. The method according to claim 7, further comprising:
assigning texton labels to a probe image to produce a second texton array;
determining first probabilities, for each location in the first and second texton arrays, that texton values of the normalized object of interest and the probe image are the same using the first conditional probability table;
determining probability of total similarity by multiplying all of the first probabilities;
determining second probabilities, for each location in the first and second texton array, that texton values of the normalized object of interest and the probe image are different using the second conditional probability table;
determining probability of total dissimilarity by multiplying all of the second probabilities;
computing a likelihood ratio using the probability of total similarity and probability of total dissimilarity; and
determining a similarity between the normalized object of interest and the probe image using the likelihood ratio.

13. The method according to claim 1, further comprising:
assigning texton labels to the plurality of normalized reference objects to create a plurality of texton arrays;
transforming the plurality of texton arrays into a vector; and
computing a linear discriminant analysis using the vector to form basis vectors.

14. The method according to claim 13, wherein the linear discriminant analysis is a Fisher linear discriminant analysis and the basis vectors are Fisher Textons.

15. The method according to claim 14, further comprising:
generating a first vector using the first texton array;
determining first projections by projecting the first vector onto the Fisher Textons;
assigning texton labels to a probe image to produce a second texton array;
generating a second vector using the second texton array;
determining second projections by projecting the second vector onto the Fisher Textons; and
determining a similarity between the normalized object of interest and the probe image using the first and second projections.

16. The method according to claim 1, wherein the object of interest is a face and the method further comprises performing face recognition.

17. The method according to claim 1, wherein the object of interest is a face and the method further comprises performing face verification.

18. The method of claim 1, wherein the object of interest is a face and the texton representations encode facial features.

19. The method of claim 7, further comprising:
generating a training set to distinguish facial features which discriminate within a class.

20. The method according to claim 7, further comprising:
generating a training set to distinguish facial features which discriminate across at least one different class.

21. An apparatus for automatically recognizing objects in digital image data, comprising:
an image processing control operably coupled to memory and functional processing units for controlling recognition processing, wherein the functional processing units comprise:
an object detection unit for detecting an object of interest in input digital image data;
a normalizing unit for obtaining a normalized object of interest;
a texton generation unit for assigning texton representations of the normalized object of interest to produce a first texton array; and
a similarity unit for determining a similarity between the texton representations and previously determined texton representations of at least one other object,
wherein the detecting unit and normalizing unit detects and normalizes, respectively, a plurality of reference objects from a plurality of images, and further wherein the texton generation unit
obtains a first plurality of filter responses based upon pixels forming the plurality of normalized reference objects,
forms a first plurality of vectors based upon the first plurality of filter responses, and
clusters the first plurality of vectors into a plurality of groups, wherein each group is assigned a texton label.

22. The apparatus according to claim 21, wherein the texton generation unit
obtains a second plurality of filter responses based upon pixels forming the normalized object of interest,
forms a second plurality of vectors based upon the second plurality of filter responses, and
creates a first texton label array by assigning the texton labels to each of the pixels forming the normalized object of interest.

23. The apparatus according to claim 22, wherein the first and second plurality of filter responses are obtained using horizontal and vertical derivatives of a plurality of circular symmetric Gaussian filters, further wherein the plurality of Gaussian filters comprise a plurality of scales.

24. The apparatus according to claim 23, wherein the Gaussian filters are separable.

25. The apparatus according to claim 23, wherein the each of the first and second plurality of vectors has a length based upon the number of filters used to obtain the first and second filter responses.

26. The apparatus according to claim 21, wherein the clustering further comprises a K-means clustering algorithm.

27. The apparatus according to claim 21, wherein the texton generation unit forms a plurality of texton arrays from images belonging to a training set taken from the plurality of normalized reference objects, and further wherein the similarity determination unit selects a pair of texton arrays from the plurality of texton arrays, determines, for each element in the pair of texton arrays, whether the texton label pair are in a same class, increments an element by one in a first conditional probability table based upon the determining finding the texton label pair are in the same class, increments an element by one in a second conditional probability table based upon the determining finding the texton label pair are in a different class, repeats the selecting, the determining, and each incrementing until all of the texton array pairs have been processed, and normalizes the first and second conditional probability tables.

28. The apparatus according to claim 27, wherein the training set is based upon in-class image vanations.

29. The apparatus according to claim 28, wherein the training set is based upon images of the same object under different imaging conditions.

30. The apparatus according to claim 27, wherein the first and second conditional probability tables are computed based upon the assumption that texton labels are independent of location in the object of interest.

31. The apparatus according to claim 27, wherein the similarity measure is based upon a likelihood ratio of the first and second probabilities.

32. An apparatus for automatically recognizing objects in digital image data, comprising:

an image processing control operably coupled to memory and functional processing units for controlling recognition processing, wherein the functional processing units comprise:

an object detection unit for detecting an object of interest in input digital image data;

a normalizing unit for obtaining a normalized object of interest;

a texton generation unit for assigning texton representations of the normalized object of interest to produce a first texton array; and a similarity unit for determining a similarity between the texton representations and previously determined texton representations of at least one other object, wherein the similarity determination unit assigns texton labels to a probe image to produce a second texton array, determines first probabilities, for each location in the first and second texton arrays, that texton values of the normalized object of interest and the probe image are the same using the first conditional probability table, determines a probability of total similarity by multiplying all of the first probabilities;

determines second probabilities, for each location in the first and second texton array, that texton values of the normalized object of interest and the probe image are different using the second conditional probability table, determines a probability of total dissimilarity by multiplying all of the second probabilities, computes a likelihood ratio using the probability of total similarity and probability of total dissimilarity, and determines a similarity between the normalized object of interest and the model image using the likelihood ratio.

33. The apparatus according to claim 21, wherein the texton generation unit assigns texton labels to the plurality of normalized reference objects to create a plurality of texton arrays, and further wherein the similarity determination unit transforms the plurality of texton arrays into a vector, and computes a linear discriminant analysis using the vector to from basis vectors.

34. The apparatus according to claim 33, wherein the linear discriminant analysis is a Fisher linear discriminant analysis and the basis vectors are Fisher Textons.

35. The apparatus according to claim 34, wherein the similarity determination unit generates a first vector using the first texton array, determines first projections by projecting the first vector onto the Fisher Textons, assigns texton labels to a probe image to produce a second texton array, generates a second vector using the second texton array, determines second projections by projecting the second vector onto the Fisher Textons, and determines a similarity between the normalized object of interest and the probe image using the first and second projections.

36. The apparatus according to claim 21, wherein the object of interest is a face and the similarity determination unit performs face recognition.

37. The apparatus according to claim 21, wherein the object of interest is a face and the similarity determination unit performs face verification.

38. The apparatus according to claim 21, wherein the object of interest is a face and the texton representations encode facial features.

39. The apparatus of claim 27, wherein the similarity determination unit generates a training set to distinguish facial features which discriminate within a class.

40. The apparatus according to claim 27, wherein the similarity determination unit generates a training set to distinguish facial features which discriminate across at least one different class.

41. The method according to claim 1, wherein said assigning step assigns texton representations of the normalized object of interest, using textons from a predetermined set of textons representing local surface characteristics for pixels of said normalized object of interest, to produce said first texton array.

42. The method according to claim 1, wherein said assigning step assigns texton representations of the normalized object of interest to produce said first texton array using labels for individual pixels of said normalized object of interest, the labels being selected from a set of texton labels which has a predetermined size.

43. The method according to claim 1, wherein said assigning step assigns texton representations of the normalized object of interest to produce said first texton array in which values corresponding to individual pixels of said normalized object of interest depend upon individual textons from a texton vocabulary and wherein said textons describe local surface characteristics of said pixels.

44. The apparatus according to claim 21, wherein said texton generation unit assigns texton representations of the normalized object of interest, using textons from a predetermined set of textons representing local surface characteristics for pixels of said normalized object of interest, to produce said first texton array.

45. The apparatus according to claim 21, wherein said texton generation unit assigns texton representations of the normalized object of interest to produce said first texton array using labels for individual pixels of said normalized object of interest, the labels being selected from a set of texton labels which has a predetermined size.

46. The apparatus according to claim 21, wherein said texton generation unit assigns texton representations of the normalized object of interest to produce said first texton array in which values corresponding to individual pixels of said normalized object of interest depend upon individual textons from a texton vocabulary and wherein said textons describe local surface characteristics of said pixels.

* * * * *